Patented June 12, 1945

2,378,169

UNITED STATES PATENT OFFICE

2,378,169
ESTERS

Courtland L. Agre and Robert M. Leekley, Wilmington, Del., assignors to E. I. du Pont de Nemours & Company, Wilmington, Del., a corporation of Delaware No Drawing. Application March 22, 1940, Serial No. 325,464

13 Claims. (Cl. 260—83)

This invention relates to esters of nitro alcohols, and more particularly to nitroalkyl esters of alpha, beta-unsaturated acids.

This invention has as an object the preparation of novel and useful esters. A further object is the preparation of novel and useful resinous polymers and interpolymers. A still further object is the preparation of rubbery interpolymers. Another object is the preparation of synthetic resins which possess high softening points and improved hardness. Other objects will appear hereinafter.

These objects are accomplished by the following invention which comprises esters of monohydric aliphatic nitro-alcohols with aliphatic alpha, beta-unsaturated acids and polymers and interpolymers of the same, particularly with polymerizable organic compounds having a negative group on a carbon atom also connected by an ethylenic double bond to a methylene ($CH_2$) group.

Many of the synthetic resins obtained by polymerizing acrylates and methacrylates are either so soft or soften at such low temperatures that they are not suitable for certain applications. It has now been found that the presence of nitro groups in the polymer has a beneficial effect on both hardness and softening temperature. Other beneficial effects are apparent in interpolymeric mixtures, as shown hereinbelow.

The monomeric nitroalkyl ester of an alpha, beta-unsaturated acid is prepared from an aliphatic nitroalcohol and an alpha, beta-unsaturated acid or acid derivative. This may be done by heating the free acid with the nitroalcohol in the presence of an esterification catalyst such as p-toluene-sulfonic acid or sulfuric acid and an antioxidant such as hydro-quinone to prevent polymerization. This is preferably done in the presence of an inert liquid medium such as benzene. This is exemplified in Examples 1 and 8 below. The monomeric nitroalkyl esters may also be prepared by ester interchange, for example, by heating a mixture of a lower alkyl ester of an unsaturated acid, such as methyl methacrylate, with a nitroalcohol in the presence of a catalyst such as p-toluenesulfonic acid and an antioxidant. The methyl alcohol formed during the course of the reaction is continuously removed from the sphere of action by distillation. The product, prepared by one of the above methods, is purified by washing with sodium bisulfite solution, sodium hydroxide solution, and water, and is finally distilled at reduced pressure in an inert atmosphere.

The polymers are prepared from the monomers by heating and usually most conveniently in the form of an aqueous emulsion and in most cases the use of a small amount of a peroxide as a catalyst is desirable. Interpolymers may be prepared from mixtures of nitroalkyl esters as well as from mixtures of these esters with other polymerizable organic compounds having a negative group on a carbon bearing an ethylenic double bond.

The more detailed practice of the invention is illustrated by the following examples, wherein parts given are by weight. There are, of course, many forms of the invention other than these specific embodiments.

Example I

A mixture of 119 parts of 2-nitro-2-methylpropanol, 107 parts of 85% aqueous methacrylic acid, 20 parts of hydroquinone, 5 parts of p-toluenesulfonic acid, and 320 parts of benzene is heated in a vessel fitted with a distilling column so that the benzene distills slowly, more benzene being added from time to time so that the volume of the reaction mixture remains constant. The distillation is continued for 30 hours during which 1600 parts of benzene and 23 parts of water distills. At the end of this time, the benzene distilling is substantially free from water. The reaction mixture, after successively extracting with 5% sodium bisulfite solution and 5% sodium hydroxide solution to remove quinone, hydroquinone and unreacted acid is washed with water and then dried over anhydrous sodium sulfate. Upon distillation in a nitrogen atmosphere, 116 parts of 2-nitro-2-methylpropyl methacrylate, boiling at 95–97° C./4 mm. is collected. It is a clear, colorless, mobile, stable liquid. Calcd. for $C_8H_{13}NO_4$:N, 7.85%. Found: N, 7.96%.

Example II

A solution of 0.3 part methyl starch in 200 parts of water is agitated and heated to 60° C. in a vessel fitted with a reflux condenser. A mixture of 50 parts of monomeric 2-nitro-2-methylpropyl methacrylate and 0.25 part of benzoyl peroxide is added with rapid stirring, the temperature rising rapidly to 95° C. Within 20 minutes polymerization is complete, but heating and stirring are continued for 20 minutes more. When the mixture is filtered through broadcloth the polymer remains on the filter in the form of medium sized granules which are washed well and dried. A portion of the product on molding at 160° C. produces a clear, hard molding, soluble in dioxan. The polymer softens at 150° C. when immersed in a heated oil bath.

The physical properties of 2-nitro-2-methylpropyl methacrylate polymer and polyisobutyl methacrylate, which differ structurally only in that the former contains the nitro group, are shown in the following table:

| Polymer | Softening temperature | Hardness |
|---|---|---|
| Poly-2-nitro-2-methylpropyl methacrylate | 150 | 360 |
| Polyisobutyl methacrylate | 70 | 210 |

The hardness was determined according to Pfund, U. S. 1,875,134.

Example III

A mixture of 75 parts of monomeric methyl methacrylate and 25 parts of 2-nitro-2-methylzoyl peroxide is polymerized as in Example II, the dispersing medium in this case consisting of a 0.1% solution of sodium starchglycolate in water. The polymerization is complete within 50 minutes, during which the temperature rises from 75° C. to 85.5° C. The polymer (88 parts), which is filtered, washed and dried as in Example II, is molded at 160° C. to a clear, brilliant, practically colorless, strong molding which is soluble in organic solvents such as ketones, esters and dioxan. It softens at 123° C. as compared with 105–110° C. for straight methyl methacrylate polymer under similar conditions.

Example IV

A mixture of 25 parts monomeric methyl acrylate, 25 parts of 2-nitro-2-methylpropyl methacrylate, and 0.25 part of benzoyl peroxide is polymerized as in Example II, using 150 parts of a 0.1% solution of sodium starchglycolate in water as the dispersing medium. The polymerization requires 50 minutes, during which the temperature rises from 80 to 84° C. The polymer (35 parts) is molded to a clear, hard chip which softens at 69° C., whereas the softening point of polymerized methyl acrylate is about 35° C.

Example V

A mixture of 75 parts 2-nitro-2-methylpropyl methacrylate, 25 parts vinyl acetate, and 2 parts benzoyl peroxide is polymerized as in Example II, using 200 parts of a 0.15% solution of the sodium salt of methacrylic acid (75%) methyl methacrylate (25%) interpolymer as the dispersion medium. The polymerization requires one and three-quarters hours, during which the temperature falls from 81 to 75° C. The polymer (81 parts) forms a clear, light colored, hard molding, softening at a temperature above 80° C., i. e., well above the softening point of polymerized vinyl acetate, which is about 35° C.

Example VI

A mixture of 25 parts monomeric methyl methacrylate, 25 parts 2-nitro-2-methylpropyl methacrylate, and 0.25 part benzoyl peroxide is polymerized as in Example II, using 150 parts of a 0.2% solution of the sodium salt of methacrylic acid (75%)-methyl methacrylate (25%)-interpolymer as the dispersing agent. The polymerization requires 30 minutes, during which the temperature rises from 78 to 91° C. The polymer (42 parts) molds at 160° C. to a clear, colorless, hard molding which softens at 125° C.

Example VII

A mixture of 30 parts 2-nitro-2-methylpropyl methacrylate, 20 parts methyl vinyl ketone, and 0.25 part benzoyl peroxide, is polymerized as in Example VI. The polymerization requires 1.75 hours, during which the temperature rises from 62 to 84° C. The polymer is molded at 160° C. to a clear, hard molding. Its softening point was 78° C., well above that of polymerized methyl vinyl ketone, which is about 40° C.

Example VIII

A mixture comprising 108 parts acrylic acid, 190 parts 2-nitro-2-methylpropanol-1, 50 parts toluene, 5 parts hydroquinone, and 2 parts p-toluenesulfonic acid is distilled until no further water separates from the condensed toluene-water binary distillate, toluene being returned to the reaction mixture continuously during the distillation. The reaction mixture is then washed several times with water, dried over calcium chloride and distilled under vacuum. One hundred and fifty parts of colorless 2-nitro-2-methylpropyl acrylate boiling at 112–113° C./14 mm. are collected. Analysis: Calculated C=48.55; H=6.35; N=8.1. Found: C=48.93; H=6.81; N=8.8. The ester polymerizes in 2 hrs. to a hard, clear, colorless solid on warming with 1% of benzoyl peroxide at 55–60° C.

Example IX

An emulsion comprising 17.5 parts butadiene, 14 parts 2-nitro-2-methylpropyl methacrylate, 10 parts 10% sodium oleate, 0.13 part sodium hydroxide, 0.25 part ammonium persulfate, 0.25 part of a sulfonated naphthalene-formaldehyde condensation product, 2.5 grams carbon tetrachloride and 20.5 parts water is heated with constant agitation in a sealed vessel for 65 hours at 40° C. To the resultant latex is added 2.5 cc. of a 25% dispersion of a 55:45 mixture of phenyl-α-naphthylamine and diphenylamine and on coagulation with brine and alcohol, a soft, plastic, coherent rubbery interpolymer is obtained in quantitative yield. After washing and milling to dryness, the rubber is readily compounded and cured in the usual manner employing carbon black, zinc oxide, sulfur, accelerator, dispersing and softening agents, to give vulcanizates possessing good tensile strength, elasticity and other rubber-like properties. The vulcanizates are markedly superior to vulcanizates of natural rubber as well as of butadiene-methyl methacrylate or butadiene-isobutyl methacrylate synthetic rubber interpolymers of similar methacrylate content in resistance to swelling in petroleum hydrocarbons.

Synthetic rubber interpolymers of butadiene with greater or lesser amounts of 2-nitro-2-methylpropyl methacrylate may be prepared in the same manner, all of which exhibit superior resistance to swelling in petroleum hydrocarbons than interpolymers of butadiene with corresponding amounts of methacrylic esters of simple aliphatic alcohols. Such interpolymers may be prepared equally as well in emulsions employing other emulsifying agents, as for example N-hydroxypropyl-C-cetyl betaine, under essentially neutral, acid, or basic conditions.

Example X

An emulsion comprising 35 parts butadiene, 15 parts 2-nitro-2-methylpropyl acrylate, 4 parts N-hydroxypropyl-C-cetylbetaine, 0.51 part sulfonated naphthalene-formaldehyde condensation product, 0.5 part ammonium persulfate, 0.3 part acetic acid, 5 parts carbon tetrachloride, and 49.2 parts water is heated in a sealed tube with constant agitation for 10 hours at 60° C. After adding 5 cc. of a 25% dispersion of a 55:45 mixture of phenyl-α-naphthylamine and diphenylamine and coagulating the emulsion, 47.7 parts of a soft, coherent, rubber-like interpolymer is obtained. The interpolymer is readily washed and milled to constant weight and finally compounded and cured to yield soft and pliable or hard rubber vulcanizates, depending on the compounding formulae and cure. The vulcanizates are characterized by good stress-strain values and are markedly superior to those of natural rubber, butadiene-methyl methacrylate, or butadiene-styrene rubbers in resistance to swelling in petroleum hydrocarbons. Interpolymers containing greater or smaller amounts of this nitro ester may be obtained likewise by changing the original butadiene: ester ratio.

*Example XI*

An emulsion comprising 60 parts 2-chlorobutadiene-1,3, 15 parts 2-nitro-2-methylpropyl methacrylate, 0.56 part sulfur, 10 parts of 65% aqueous solution of the sodium salt of the sulfated ester of oleyl acetate, 0.37 part of a sulfonated naphthalene-formaldehyde condensation product and 164 parts water is maintained at 40° C. for 1½ hours. After addition of 1.5 cc. of a 50% dispersion of a 55:45 mixture of phenyl-α-naphthylamine and diphenylamine, the emulsion is coagulated with brine and alcohol, and after washing and drying the product on the usual corrugated and smooth rubber mills, 68.1 parts of a soft, plastic, synthetic rubber are obtained. The interpolymer consists of 18.8% of 2-nitro-2-methylpropyl methacrylate and 81.2% chloroprene. The rubber is compounded as follows:

| | Parts |
|---|---|
| Interpolymer | 10 |
| Magnesium oxide | 0.4 |
| Zinc oxide | 0.5 |
| Carbon black | 3.6 |

The mix is vulcanized for 20 minutes at 267° F. and a vulcanizate is obtained which exhibits good tensile strength and good elasticity. The vulcanizate shows less swelling in kerosene than rubber obtained from 2-chlorobutadiene-1,3 alone in the above emulsion system.

*Example XII*

A solution of 60 parts chloroprene, 15 parts 2-nitro-2-methylpropyl methacrylate and 0.75 part benzoyl peroxide in 60 parts carbon tetrachloride is heated for 5 hours at 80° C. After washing the resultant viscous solution with alcohol and milling the product with 0.75 part phenyl-α-naphthylamine to constant weight, 74.5 parts of rubber-like polymer are obtained. On compounding and curing as in Example 5, a vulcanizate showing satisfactory stress-strain values and good rubber-like properties is obtained. The interpolymer shows less swelling in petroleum hydrocarbons than vulcanizates of unmodified 2-chlorobutadiene-1,3 rubber prepared in similar manner.

When the synthetic resins of the present invention are prepared by emulsion polymerization, any substances may be used as emulsifying agents, which, when dispersed in water, are capable of giving permanent dispersion in the water of the mixture of polymerizable materials. The most suitable of the emulsifying agents are those which give stable dispersions without promoting hydrolysis of the ester to an undesirable extent. Examples of such agents are the sodium salt of the sulfate ester of oleyl acetate, sodium salts of sulfated long-chain alcohols such as the sodium salt of the sulfate ester of the alcohols obtained by the hydrogenation of coconut oil or sperm oil, sodium salts of lignin sulfonic acid, "Ivory" soap, cetyl p-dimethylaminobenzoate methosulfate, cetyl trimethyl ammonium bromide $$(C_{16}H_{33}(CH_3)_3N—Br),$$

cetyl methyl piperidinium methyl sulfate $$(C_{16}H_{33}(CH_3)(C_5H_{10}=)NOSO_2OCH_3),$$

oleoamidoethyl diethylamine acetate $$(C_{17}H_{33}CONHC_2H_4NH(C_2H_5)_2OCOCH_3),$$

N-stearyl betaine $(C_{13}H_{37}(CH_3)_2NCH_2COO)$,

C-cetyl betaine $(C_{16}H_{33}CHCOON(CH_3)_2)$, para-stearamidophenyltrimethylamine methylsulfate $$C_{17}H_{35}CONHC_6H_4N(CH_3)_3OSO_2OCH_3.$$

A 2 or 3% solution of an emulsifying agent in water is usually suitable for forming a good dispersion but a stronger or weaker solution, for example .02% to 10%, may also be used.

Where the polymerization of interpolymerization is carried out by a method which gives a granular product, agents which have the property of being relatively poor dispersing agents and thereby forming nuclei for the formation of granules of the interpolymer may be used. The granulation process may be defined as a method for preparing the above interpolymers in granular form which comprises dispersing, and polymerizing while thus dispersed, the polymerizable monomer mixture in water by means of a dispersing agent and stirring or shaking, the concentration of the dispersing agent being not substantially greater than an amount sufficient to maintain the monomers in the dispersed phase while stirring is continued and to prevent coalescence of the dispersed particles during polymerization, the quantity of dispersing agent also being insufficient to give a permanently dispersed product. It will thus be appreciated that efficient agitation is essential from the inception of the actual polymerization until the product is substantially completely polymerized, since separation in two liquid phases takes place if the agitation is interrupted before or shortly after the inception of polymerization. As granulation agents, the following illustrative agents may be used: interpolymer prepared from 75% methacrylic acid and 25% of methyl methacrylate which has been neutralized with sodium hydroxide to a pH of 7 to 8; sodium cellulose-glycolate, sodium starchglycolate, methyl starch, soluble starch, gums of various kinds such as gum tragacanth and acacia, polymethacrylamide, partially hydrolyzed polyvinyl acetate, partially neutralized polymethacrylic acid, glue, gelatin, agar agar, sodium algenate.

For interpolymerization by the granulation method, a .1% to 1% solution of a granulation agent is usually suitable. Those skilled in the art will appreciate the fact that the enumerated colloids do not all have equal dispersing powers, e. g., gum tragacanth is less effective than sodium starchglycolate. Accordingly, when changing from one colloid to another a greater or lesser amount thereof must be employed providing the effectiveness of the substituting colloid is less or greater than that of the colloid first employed. The determining factor is of course that the percentage of colloid be so adjusted that the preferred granular form of polymer is produced.

As catalysts for polymerization, hydrogen peroxide and benzoyl peroxide are particularly well suited although other catalysts capable of delivering active oxygen to the systems may be employed, such as the peroxides of sodium or barium. An amount of catalyst corresponding to 0.4 to 0.8% of the polymerizable material in the mixture is very satisfactory though the amount is varied in either direction and depending upon the polymerization rate the unsaturated ester smaller or larger amounts may be employed.

The ratios of the dispersed phase to water may be widely varied. Convenient and satisfactory amounts of water are in the range of 100% to about 300% in the dispersed phase. For the solution method either concentrated or dilute solutions of the polymerizable materials in organic solvents may be employed and typical solvents may include carbon tetrachloride, dioxane, ethylene dichloride, acetone, butyl acetate, benzene and toluene. If desired the polymerization may be made in bulk, that is, without these solvents.

The polymerization may be carried out conveniently at 40-45°, excellent interpolymers being obtainable at this temperature after 2 to 10 hours of heating. However, the temperature can be increased to about 90 to 100° or above and the time of polymerization thereby greatly reduced. It is, of course, obvious that when a volatile component such as butadiene is employed for the preparation of the interpolymer, the pressures developed by polymerization at 45° C. are much less than those developed at 100° C. and hence at the higher temperature, stronger pressure equipment is needed than for polymerization at 45° C. When the emulsion procedure is used, effective initial agitation is required and thereafter only occasional agitation to maintain the emulsion, whereas the granulation method requires highly efficient agitation during the entire polymerization cycle. No agitation is required when the polymerization is carried out in solution in an inert solvent or in bulk.

The emulsions or dispersions may be coagulated by any of the known methods applicable to dispersions made with the particular dispersing agent employed. In most cases the emulsions may be coagulated by means of a 10% aluminum sulfate solution added slowly and with stirring. Sodium chloride or other salt solutions, free acids such as dilute hydrochloric acid or acetic acid, or in general solutions of electrolytes may be employed. Alternatively, the emulsions may in some cases be broken by heating or by freezing, thereby avoiding the addition of foreign material such as the electrolyte previously mentioned. Another method occasionally employed is to add an excess of an alcohol such as an ethyl or butyl to the emulsion. Ordinarily a coagulating agent is not required when the granulation procedure is used but should a small amount of emulsion be obtained along with the granular product, the emulsion can be broken and the coagulating product obtained by any of the procedures just described. No coagulating agent is needed when polymerization is conducted in a solvent or in the undiluted form.

The invention is generic to aliphatic monohydric nitroalcohol esters of aliphatic alpha, beta-unsaturated acids. Any aliphatic monohydric nitroalcohol may be used to prepare the monomeric esters of the present invention. The nitroalcohols of the general formula

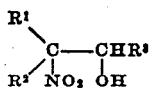

wherein $R^1$, $R^2$, and $R^3$ are hydrogen or monovalent aliphatic including cycloaliphatic and preferably alkyl radicals, are particularly useful because they can readily be prepared by condensation of aldehydes with nitroparaffins as disclosed in U. S. Patents 2,132,330; 2,132,352; 2,139,120; 2,139,121. Specific alcohols useful include 3-nitro-2-butanol, 2-nitro-3-hexanol, 2-nitro-1-butanol, 3-nitro-2-pentanol, 3-nitro-4-heptanol, 2-nitro-1-pentanol, 3-nitro-2-hexanol, 5-nitro-4-octanol, 1-nitro-2-butanol, 1-nitro-2-pentanol, 2-nitro-3-pentanol, 2-methyl-2-nitro-1-propanol, 3-methyl-3-nitro-2-butanol, 2-methyl-2-nitro-3-hexanol, 2-methyl-2-nitro-1-butanol, 3-methyl-3-nitro-2-pentanol, 3-methyl-3-nitro-4-heptanol, 3-methyl-2-nitro-1-butanol, 4-methyl-3-nitro-2-pentanol, 2-methyl-3-nitro-4-heptanol, 3-methyl-1-nitro-2-butanol, 4-methyl-2-nitro-3-pentanol, 2-methyl-4-nitro-3-hexanol, 2-nitro-2,4-dimethyl-3-pentanol, 4-nitro-2-methyl-3-heptanol, 4-nitro-2,4-dimethyl-3-hexanol, 4-nitro-2,5-dimethyl-3-hexanol.

Any strictly aliphatic alpha, beta-unsaturated carboxylic acid may be used including acrylic, methacrylic, fumaric, maleic, chloroacrylic, itaconic, crotonic, and sorbic acids.

Alpha-methylene acids, i. e., acids containing the methylene ($CH_2$) groups attached by a double bond to the carbon alpha to, i. e., adjacent to, the carboxyl are preferred. Since polymers derived from relatively low molecular weight esters melt higher and are harder than those derived from longer chain esters, those nitroalkyl esters which contain a total of not more than 12 carbon atoms are preferred.

By the term "aliphatic alpha, beta-unsaturated acid" is meant a carboxylic acid wherein the carbon attached to the carboxyl is attached to another carbon by an ethylenic double bond, the acid being entirely aliphatic.

In the preparation of the monomeric ester, the acid per se may be replaced by another ester-forming derivative thereof, e. g., an anhydride, acid halide, nitrile or ester with an alcohol more volatile than the nitroalcohol to be esterified.

The polymerization of the nitroalcohol esters, whether alone or mixed with other polymerizable materials, may be carried out at any temperature between approximately 30° C. and 120° C., the preferred range being from about 50° C. to about 100° C. The time required for polymerization is dependent on the compounds being polymerized, temperature, and catalyst, and may vary from a few minutes to several days.

The polymerization or interpolymerization may be carried out in the presence of polymerization catalysts, e. g., inorganic per salts and peroxides, e. g., hydrogen peroxide, inorganic perborates and persulfates, organic per acids and peroxides, e. g., benzoyl peroxides, acetyl benzoyl peroxide, dilauryl peroxide, dibutyryl peroxide and succinyl peroxide.

The nitroalkyl esters of the present invention may be polymerized with other polymerizable organic compounds, but preferably with those having a negative group on an aliphatic ethylenic bonded carbon.

Preferably the other polymerizable substance is a polymerizable organic compound containing a methylene ($CH_2$) group attached by an ethylenic double bond to a carbon atom, which is in turn attached to at least one negative group, as disclosed in Henrich (Johnson, Hahn) Theories of Organic Chemistry, chapter 8, the negative groups including RCO—, RCOO—, NO₂—, C₆H₅—, C₁₀H₇—, C₆H₅O—, RO—, RNHCO—, NH₂CO— (RCO)₂N—, RCONH—, Cl—,

CH₂=CH—

RCH=CH—, CH≡C—, HOOC—CH=CH—, CH₂=CH—O—, wherein R is alkyl, aryl, aralkyl, heterocyclic, alicyclic, or alkenyl. Preferably, the other polymerization component is a vinyl or vinylidene compound. Suitable components for interpolymerization are alkyl esters of acrylic, methacrylic, fumaric, maleic, chloroacrylic, itaconic, crotonic and atropic acids, the corresponding free acids and other acid derivatives such as anhydrides, amides and nitriles, vinyl chloride, styrene, butadiene, vinyl acetate, chloroprene, methyl vinyl ketone, etc. The term "polymer" is used in a sense generic to simple or straight polymers, i. e., where the components of the polymer are all the same polymerizable monomers, and to interpolymers of two or more polymerizable monomers. Interpolymers may also be prepared from mixtures of the nitroalkyl esters themselves with or without addition of other unsaturated compounds.

The resins may be modified by addition of appropriate fillers, pigments, dyes, plasticizers, softeners or by blending with other resins.

The aliphatic monomeric monohydric nitroalcohol esters of aliphatic alpha, beta-unsaturated acids of the present invention are useful for the preparation of polymers and interpolymers. The polymers, including simple polymers and interpolymers, of the nitroalkyl esters of methacrylic acid and other alpha, beta-unsaturated acids may be prepared in bulk in containers of any shape to give castings in the shape of the container. They may also be shaped or formed by sawing, drilling, filing, turning, etc. They may be molded by the known methods of molding, and they may be formed into foils or films by casting from solution or by hot pressing. Solutions of these resins are also suitable for coating and impregnating compositions and as textile sizes.

The softness and low softening temperature of most acrylate and methacrylate polymers is a serious disadvantage in their use as glass substitutes. The introduction of nitro groups in a methacrylate resin increases the hardness and raises the softening temperature.

The above description and examples are intended to be illustrative only. Any modification of or variation therefrom which conforms to the spirit of the invention is intended to be included within the scope of the claims.

What is claimed is:

1. An ester of a monohydric aliphatic nitroalcohol with an aliphatic alpha, beta-ethylenically unsaturated carboxylic acid.
2. An ester of a monohydric aliphatic nitroalcohol with an aliphatic alpha, beta-ethylenically unsaturated carboxylic acid, said ester having not more than twelve carbon atoms.
3. An ester of a monohydric aliphatic nitroalcohol with an alpha methylene unsaturated carboxylic acid, said ester having not more than twelve carbon atoms.
4. An ester of a monohydric aliphatic nitroalcohol with methacrylic acid.
5. An ester of 2-nitro-2-methylpropanol with an aliphatic alpha, beta-ethylenically unsaturated carboxylic acid.
6. 2-nitro-2-methylpropyl methacrylate.
7. A polymer of 2-nitro-2-methylpropyl methacrylate.
8. An ester of a monohydric aliphatic nitroalcohol with an alpha-methylene carboxylic acid.
9. A polymerization product of an ester of a monohydric aliphatic nitroalcohol with an aliphatic alpha, beta-ethylenically unsaturated carboxylic acid.
10. A composition comprising an interpolymer of ingredients comprising 2-nitro-2-methylpropyl methacrylate and methyl methacrylate.
11. A composition comprising an interpolymer of ingredients comprising (1) an ester of a monohydric aliphatic nitroalcohol with an aliphatic alpha, beta-ethylenically unsaturated carboxylic acid and (2) an organic compound copolymerizable with the said ester and containing at least one $$CH_2=C\diagup\diagdown$$

grouping.

12. A composition comprising an interpolymer of ingredients comprising (1) an alkacrylic ester of a monohydric aliphatic nitroalcohol and (2) an organic compound copolymerizable with the said ester and containing at least one $$CH_2=C\diagup\diagdown$$

grouping.

13. A composition comprising an interpolymer of ingredients comprising (1) 2-nitro-2-methylpropyl methacrylate and (2) an organic compound copolymerizable with the said ester and containing at least one $$CH_2=C\diagup\diagdown$$

grouping.

COURTLAND L. AGRE.
ROBERT M. LEEKLEY.

CERTIFICATE OF CORRECTION.

Patent No. 2,378,169. June 12, 1945.

COURTLAND L. AGRE, ET AL.

It is hereby certified that error appears in the printed specification of the above numbered patent requiring correction as follows: Page 2, first column, lines 18 and 19, for "2-nitro-2-methyl-zoyl" read --2-nitro-2-methylpropyl methacrylate containing 0.5 part of benzoyl--; and that the said Letters Patent should be read with this correction therein that the same may conform to the record of the case in the Patent Office.

Signed and sealed this 15th day of January, A. D. 1946.

Leslie Frazer

First Assistant Commissioner of Patents.

(Seal)